United States Patent Office 3,704,157
Patented Nov. 28, 1972

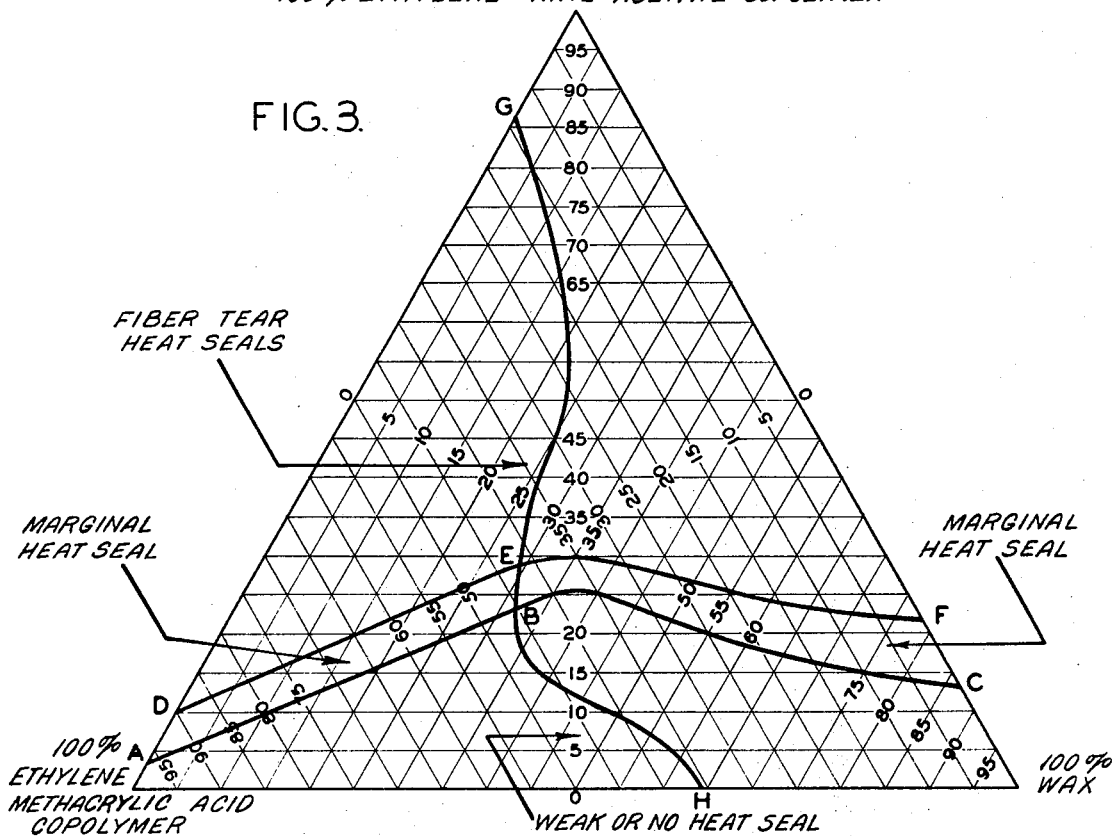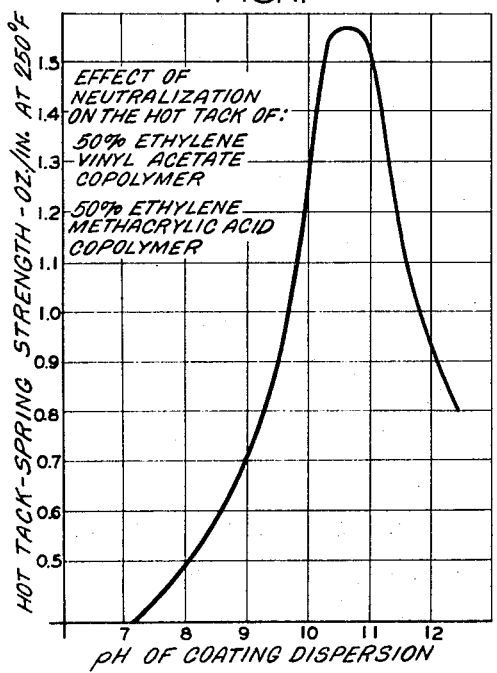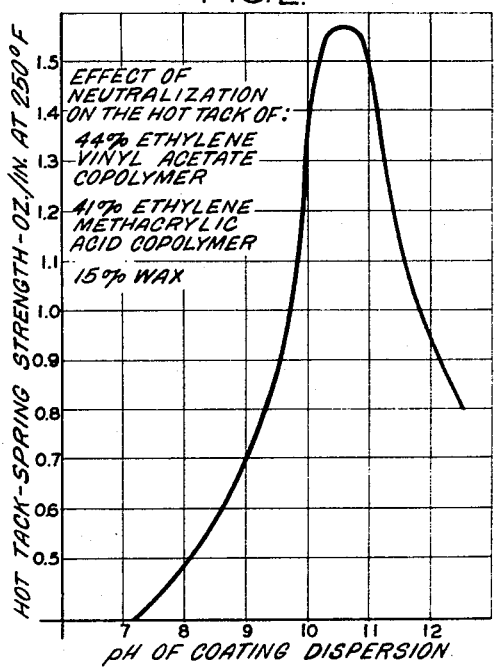

3,704,157
COATED ARTICLE AND METHOD OF MAKING SAME
John William McDonald, Wilmington, Del., assignor to E. I. du Pont de Nemours and Company, Wilmington, Del.
Filed Nov. 23, 1970, Ser. No. 91,849
Int. Cl. C09j 7/04
U.S. Cl. 117—68.5
16 Claims

ABSTRACT OF THE DISCLOSURE

A sheet material having heat seal properties including improved hot tack is provided by coating a paper sheet substrate with a mixture comprising (A) a copolymer of ethylene and a vinyl alkanoate and from 0 to about 10% of an alpha, beta-ethylenically unsaturated carboxylic acid, and (B) a copolymer of ethylene and an alpha, beta-ethylenically unsaturated carboxylic acid in which the carboxylic acid groups are neutralized to a predetermined extent, and, in the preferred embodiment (C) wax. A method for making the sheet material is also provided utilizing an aqueous dispersion of the stated mixture having a pH of at least 9 and preferably from about 10 to about 11.

BACKGROUND OF THE INVENTION

Field of the invention

This invention relates to heat sealable sheet materials adapted for packaging and particularly form-fill packaging, and more particularly, to such sheet material having an exposed coating of improved hot tack (high temperature cohesion and adhesion) comprising a mixture of ethylene copolymers, and, in the preferred embodiment, wax. The coating is applied as an aqueous dispersion of the stated mixture, having a predetermined alkaline pH, followed by drying.

In form-fill packaging, use is made of a flexible sheet-material, normally coated paper, having certain desired properties including heat-sealability (inside to inside and inside to outside), moisture barrier protection and gloss. In a typical form-fill packaging operation, the sheet is formed into a tube by heat sealing the inside of an edge portion to the outside of the opposite edge portion; a flat bottom seal (inside to inside) is formed by heated jaws; an air jet inflates the partially formed bag; the heated jaws release and a jet blows in the product with which the package is to be filled; a pair of bars squeeze flat the bag at the top forcing the contents toward the bottom; the heated jaws then simultaneously form the top seal of the bag and the bottom seal of the next bag, and the operation is repeated along the length of the tube. It will be seen that, during the filling operation, the bottom seal is subjected to stress while still hot. It is essential, therefore, that the inside surface of the tube possess, at the heat sealing temperature, high cohesion and adhesion to itself (high hot tack, sometimes referred as high melt strength); that is, the ability to form a heat-seal bond that resists cohesive and adhesive failure on application of stress while the bond is still hot from the heat sealing operation.

PRIOR ART

Existing flexible sheet materials for form-fill packaging are mainly composed of a paper sheet substrate having an inside coating of polyvinylidene chloride (PVDC), usually double coated, and an outside coating of heat seal moisture barrier lacquer composed chiefly of a copolymer of ethylene and vinyl acetate. PVDC, however, possesses certain known limitations which are desirably reduced or eliminated. Among those undesirable characteristics of PVDC which could be improved are poor low temperature flexibility, embrittlement with aging and poor color stability with aging.

Coatings of a copolymer of ethylene and an alpha, beta-ethylenically unsaturated carboxylic acid, such as methacrylic acid, with or without wax have excellent hot tack but have limited heat sealability particularly to ethylene/vinyl acetate copolymer heat seal lacquers having a high level of moisture barrier. Coatings of a copolymer of ethylene and a vinyl alkanoate, such as vinyl acetate, with or without wax show excellent heat sealability to ethylene/vinyl acetate heat seal lacquers of high moisture barrier properties but normally do not have adequate hot tack to operate on the more demanding form-fill packaging machines. However, these ethylene copolymers, particularly copolymers of ethylene and methacrylic acid, are known to possess better low temperature flexibility and color stability with aging and less embrittlement with aging, than PVDC.

Mixtures of the above two types of ethylene copolymers have been suggested. Thus, in copending application Ser. No. 801,741, filed Feb. 24, 1969 by Thomas Charles Bissot is disclosed a mixture of an ethylene/vinyl acetate copolymer and an ethylene/methacrylic acid copolymer, the latter serving as an emulsifying agent for the former.

The present invention is based on the discovery that certain mixtures of the two types of ethylene copolymers, preferably also containing wax, provide an extremely valuable "inside" for the form-fill packaging sheet material in having excellent heat sealability even to ethylene/vinyl acetate heat seal lacquers of high moisture barrier qualities and high hot tack in addition to having better low temperature flexibility and color stability with aging and less embrittlement with aging than PVDC.

SUMMARY OF THE INVENTION

According to the present invention there is provided a sheet material, especially adapted for use in form-fill packaging having heat seal properties including high hot tack, comprising a flexible paper sheet substrate having thereon a coating comprising a mixture of (A) a copolymer of ethylene and a vinyl alkanoate and from 0 to about 10% of an alpha, beta-ethylenically unsaturated carboxylic acid, and (B) a copolymer of ethylene and an alpha, beta -ethylenically unsaturated carboxylic acid in which from about 30 to about 90% of the acid groups are neutralized, the proportion, by weight, of A to B being from about 10 to about 90% of A to from about 90 to about 10% of B, based on the combined weight of both.

The sheet material of the present invention is provided by applying to a flexible paper sheet substrate a coating of an aqueous dispersion comprising a mixture of copolymers A and B, the dispersion having a pH of at least 9, and thereafter drying the dispersion coating.

DETAILED DESCRIPTION OF THE INVENTION

As stated, the coating of the present invention has as its basic components two ethylene copolymers, referred to herein for convenience as copolymer A and copolymer B.

Copolymer A is a copolymer of ethylene and a vinyl alkanoate such as vinyl formate, vinyl acetate, vinyl propionate and vinyl butyrate. Such copolymers will normally contain from about 30 to about 97%, by weight, of copolymerized ethylene and from about 3 to about 70%, by weight of copolymerized vinyl alkanoate, based on the combined weight of the copolymerized ethylene and vinyl alkanoate. Copolymers of ethylene and vinyl acetate are particularly suitable. Advantageously, such ethylene/vinyl acetate copolymers contain from about 50 to about 90%, preferably from about 60 to about 85%, by weight, of copolymerized ethylene and from about 50 to about 10%, preferably from about 40 to about 15%, by weight, of copolymerized vinyl acetate. Copolymer A may be a copolymer of ethylene, a vinyl alkanoate, such as mentioned above, and an alpha, beta-ethylenically unsaturated carboxylic acid, such as those mentioned below in conection with the discussion of copolymer B. Such copolymer may contain up to about 10% by weight, of the alpha, beta ethylenically unsaturated carboxylic acid based on the combined weight of the three components, the ethylene and vinyl alkanoate being in the proportions relative to each other set forth above.

These copolymers are generally prepared by high-pressure free-radical catalysis processes. Copolymers prepared by low-pressure coordination catalysis processes are also suitable. Exemplary patents illustrating copolymer preparation are U.S. Pat. 2,703,794 issued to Milton J. Roedel on Mar. 8, 1955 and U.S. Pat. 3,215,657 issued to Aleksander Beresniewicz on Nov. 2, 1965. The molecular weight of useful copolymers can be varied over a wide range. However, the copolymers generally have molecular weights corresponding to a melt index of 1 to 150, particularly under 25 and preferably from about 2 to about 6. Copolymer melt index is determined as described in ASTM–D–1238–65T.

Copolymer B is a copolymer of ethylene and an alpha, beta-ethylenically unsaturated carboxylic acid having at least about 60%, by weight, preferably at least about 80%, by weight, of ethylene, and 0.3 to about 40%, preferably 0.3 to about 20%, by weight, of the acid. In such copolymers, used according to the present invention, from about 30 to about 90%, preferably from about 45 to about 75%, of the acid groups are neutralized with alkali metal ions, especially sodium or potassium. Typical acids are acrylic acid, methacrylic acid, fumaric acid, maleic acid, itaconic acid and aconitic acid. Acid derivatives of the aforesaid, such as esters, amides, anhydrides and the like may also be used as monomers. While these derivatives must be convertible to a free carboxylic acid group prior to formation of the copolymer, it is not necessary that all such derivatives groups be converted to free carboxyl groups. The preferred acid monomer is methacrylic acid, and is preferably present in the copolymer in an amount of from about 5 to about 18%, preferably from about 10 to about 15%, by weight, the balance (from about 82 to about 95%, preferably from about 85 to about 90%) being copolymerized ethylene. Copolymers B generally have a molecular weight (unneutralized) corresponding to a melt index of 10 to 150, and preferably from about 50 to about 120.

Copolymers A and B are generally prepared and, in accordance with the present invention, are used in the form of aqueous dispersions. Dispersions of copolymer (A) and of copolymer (B) may be separately prepared and then mixed. Dispersions of copolymer (A) may be prepared by dissolving the copolymer in an organic solvent which is immiscible with water and which has a boiling point of 40–160° C., preferably 80–120° C.; mixing the solution with water and thereafter distilling off the solvent as described in U.S. Pat. 3,347,811, issued Oct. 17, 1967 to Thomas C. Bissot. Dispersions of copolymer (B) with neutralization of the carboxylic acid groups may be prepared as described in U.S. Pat. 3,296,172, issued Jan. 3, 1967 to Dennis Light Funck and Vernon Clare Wolff, Jr. On the other hand, a codispersion of copolymer (A) and copolymer (B) with neutralization of the carboxylic acid groups of the latter may be prepared as described in copending application Ser. No. 801,741, filed Feb. 24, 1969 by Thomas Charles Bissot.

In a preferred embodiment, the coating also contains a wax in an amount up to about 40%, by weight, of the combined solids (copolymers (A) and (B) and wax). The hydrocarbon waxes which are preferred for use in this invention are the paraffin waxes of petroleum origin. These waxes are mixtures of solid hydrocarbons derived from the overhead wax distillate fraction obtained from the fractional distillation of petroleum. After purification, the paraffin wax contains hydrocarbons that fall within the formulas $C_{23}H_{48}$ to $C_{35}H_{72}$. The waxes are hard, colorless and translucent materials having melting points generally in the range from about 120 to 200° F., preferably 120 to 180° F. The wax component, is, of course, not limited to the waxes of petroleum origin since waxes having similar properties, which are of natural origin, e.g. beeswax and carnauba wax as well as low molecular weight polyethylene wax, i.e. wax having a molecular weight in the range of from about 2000 to 6000 may be used alone or in combination with the petroleum waxes. The presence of wax improves moisture barrier and slip and provides lower temperature flow. The preferred amount of wax is from about 5 to about 30% on the above basis.

An important feature of the present invention is the degree of neutralization of the carboxylic acid groups of copolymer (B). Hot tack is significantly influenced by the degree of neutralization. Best hot tack performance is obtained when from about 45 to about 75% of the carboxylic acid groups in copolymer (B) are neutralized (equivalent to a pH for the dispersion employed of from about 9, preferably from about 10, to about 12, preferably to about 11). This is illustrated in FIGS. 1 and 2. In these figures are curves showing the influence of pH of a particular specific coating dispersion on the hot tack performance of the coating (measured in terms of ounces per in. of spring strength at 250° F. according to the techniques described hereinafter in connection with the examples). In FIG. 1 the coating was a 50/50 blend of (1) a copolymer of 75% ethylene and 25% vinyl acetate having a melt index of 20 and (2) a copolymer of 89% ethylene and 11% methacrylic acid. In FIG. 2 the coating was a 44/41/15 (parts by weight) blend of (1) a copolymer of 75% ethylene and 25% vinyl acetate having a melt index of 20, (2) a copolymer of 89% ethylene and 11% methacrylic acid and (3) paraffin wax having a melting point of 141–145° F. The pH of the coating dispersion is adjusted by the addition of an alkali metal hydroxide, generally sodium hydroxide. The coatings were applied to glassine paper as described in connection with Examples 7–18. It should be pointed out that these hot tack determinations were made at 250° F. at which temperature dispersions at a pH approaching 12 will not activate because of their low melt index at that high pH. However, at higher heat sealing temperatures dispersions having a pH approaching 12 would also be expected to provide excellent hot tack. On the other hand, dispersions at pH's approaching 12 show reduced heat seal performance.

The relative proportions of copolymers (A) and (B) in the coating also influence the properties of the coating. In accordance with the broader aspects of the invention, the relative proportions of the two copolymers may range from about 10 to about 90%, preferably from about 15 to about 80% of (A) to from about 90 to about 10%, preferably from about 85 to about 20%, of (B), by weight, and based on the combined weight of both copolymers. However, with the preferred system where copolymer (A) is ethylene/vinyl acetate copolymer and copolymer (B) is ethylene/methacrylic acid, with or without wax, there is a preferred relationship for optimum heat seal and hot tack performance. This is illustrated in FIG. 3 which is a triangular coordinate plot of relative proportions of (1) ethylene/vinyl acetate copolymer; (2) ethylene/methacrylic acid; and (3) wax, versus heat sealability to ethylene/vinyl acetate lacquer on glassine and hot tack. The compositions tested in gathering data on which FIG. 3 is based were prepared from suitable combinations of: (1) a 50% solids dispersion of a copolymer of 75% ethylene and 25% vinyl acetate having a melt index of 2; a 20% solids dispersion of 85% ethylene and 15% methacrylic acid in which 60% of the acid groups are neutralized with sodium hydroxide, pH about 10; and (3) a 56% solids dispersion of 15% of a copolymer of ethylene (89%) and methacrylic acid in which about 50% of the acid groups are neutralized with sodium hydroxide and 85% paraffin wax, M.P. 141–145° F., pH of dispersion about 10. With this particular system below curve ABC heat sealability was poor, and between curves DEF and ABC heat sealability was marginal but suitable in some instances. To the left of curve GEBH the hot tack (at 250° F.) was greater than a spring strength of 1.6 oz./in. (as measured according to the technique described hereinafter in connection with the examples). Thus, an optimum relationship for the relative proportions of this particular system is defined by the curve DGE.

The coating of the present invention when applied to the paper sheet substrate provides primarily high hot tack (coating to coating or inside to inside in a tubular arrangement), high heat sealability (coating to back, or inside to outside in a tubular arrangement), resistance to staining or penetration of the product oils and some moisture barrier improvement to the overall packaging material. The substrate may be paper, including glassine and bleached or unbleached sulfite or sulfate papers which may or may not be calendered or a paper/film or foil laminate. Improvement has been found in pre-coating the substrate with a first polymeric coating before applying the coating of the invention. A particularly suitable precoat in this regard is a copolymer as described in connection with copolymer B, particularly a copolymer of ethylene and methacrylic acid containing from about 85 to about 90% of copolymerized ethlyene, in which from about 10 to about 60% of the carboxylic acid groups are neutralized. It is also preferred that the substrate have a coating on the side opposite from that of the coating of this invention (i.e. on the outside in a tubular arrangement) which acts as a moisture barrier and to which the coating of the invention can be heat sealed. A preferred outside coating in this regard is a lacquer composed essentially of an ethylene/vinyl acetate copolymer.

The coatings of the present invention are applied to the substrates as aqueous dispersions, having a solids content which may range from as low as about 10 to as high as about 60%, by weight, more usually from about 20 to about 50%. The coating weight (dry) is generally from about 0.5 to about 4 or 5 pounds/3000 sq. ft. ream. The means of application are conventional and include smooth rolls followed by air knife metering, Meyer Rods and gravure rolls. The dispersion coating is then heated to remove the water and to coalesce the particles into a substantially continuous film. While drying may be done at room temperature, the action is hastened at temperatures above 100° F. Once water is removed the coating is heated to temperatures required for film formation and this may range from about 110° F. to about 300° F. depending upon the specific copolymers used. In practice, the wet coated substrate is generally subjected to heated air at a temperature desired for film formation and this drys the coating and coalesces the particles.

While the coating composition employed in accordance with the present invention has been described above as consisting essentially of copolymers A and B, and optionally wax, it will be realized that this is not intended to exclude minor amounts of other substances that do not materially alter or detract from the novel characteristics thereof. For example, minor amounts of a resin or rosin derivative may be added to modify tack.

The present invention will be more readily understood from a consideration of the following specific examples which are given for the purpose of illustration only and are not to be considered as limiting the scope of the invention in any way.

In these examples the blends were prepared by mixing the various dispersions with stirring. All of the resultant blends were stable, and the pH thereof was measured with a Corning Model 10 pH meter. The blends, and pre-coats and lacquer where used were applied as coatings to 30 lb. glassine paper (Deerfield Opaque) by drawdown with a #6 Meyer Rod. The coatings were dried in a circulating air oven at 120–125° C. for 10–15 seconds.

Data on "heat seal" and "hot tack" are set forth in these examples.

Heat seal data were obtained by heat sealing the coatings of the present invention to the lacquer-coated glassine at 250° F., under 10 p.s.i. for 0.5 seconds. After cooling, the samples were hand separated and the delamination strengths were graded by letter designation as follows: A-no bond; B-weak to medium bond (10–100 g./in.); C-medium to strong bond (100–300 g./in.), and D-fiber tear (failure within the paper). Intermediate letter designations represent intermediate strengths.

Hot tack data were obtained using a test developed to predict the performance of coatings on commercial form-fill packaging equipment utilizing a spring to simulate the parting force exerted on a newly formed heat seal bond during the following typical sequence of a form-fill packaging operation: (a) a sheet of the coated packaging material is formed into a cylinder with a back heat seal, and heated jaws close to form a flat bottom seal; (b) an air jet inflates the partially formed bag; (c) the heated jaws release and, nearly simultaneously, an air jet blows in the product with which the bag is to be filled; (d) stripper bars flatten a portion of the bag at the top forcing the contents toward the bottom and the fresh bottom heat seal; and (e) the heated sealing jaws then simultaneously form the top seal of the filled bag and the bottom seal of the next bag as in (a). The filling operation in steps (c) and (d) exert a peeling force on the bottom seal while it is still hot. The device used to simulate this force is cut from a 7.6 cm. x 20.3 cm. strip of spring steel roughly into the shape of an hour glass. The width of the narrow neck at the middle being controlled to exert a predetermined force when the spring is bent over end-to-end and released. Springs were prepared in this way to exert forces of 0.6; 0.8; 1.2 and 1.6 oz./in., respectively. In conducting the test, a 7.6 cm. x 25.4 cm. strip of coated sample is made into a loop by heat sealing the two ends together with the inside of the two ends of the strip facing each other. The bent over (compressed) spring is inserted inside the loop and temporarily held in its compressed condition. A second heat seal is then made close to the ends of the compressed spring and the loop is removed from the heat sealer with the simultaneous release of the spring. As the spring trips to open to its normal flat condition it exerts a peeling force on the hot bond. If the bond opens, the sample fails (F) at that force level; and conversely, the sample passes (P) if the bond holds.

The compositions of Examples 1–3 were prepared by mixing (A) a 20% solids dispersion of a copolymer of 85% ethylene and 15% methacrylic acid in which 60% of the acid groups are neutralized with sodium hydroxide and (b) a 50% solids dispersion of 85% of a copolymer of 75% ethylene and 25% vinyl acetate, having a melt index of 2, and 15% of a copolymer of about 89% ethylene and 11% methacrylic acid in which about 30% of the acid groups are neutralized with sodium hydroxide, to give the relative proportion of "vinyl" (ethylene/vinyl acetate copolymer) and of "ionomer" (ethylene/methacrylic acid copolymer solids) as set forth in Table I.

The compositions of Example 4–7 were prepared by mixing (A) a 20% solids dispersion of copolymer of 85% ethylene and 15% methacrylic acid in which 60% of the acid groups are neutralized with sodium hydroxide; (b) a 56% solids dispersion, 85% paraffin wax (M.P.

141–145° F.) and 15% of a copolymer of 89% ethylene and 11% methacrylic acid in which about 50% of the acid groups are neutralized with sodium hydroxide and having a pH of about 10, and (C) a 50% solids dispersion of 85% of a copolymer of 75% ethylene and 25% vinyl acetate, having a melt index of 2, and 15% of a copolymer of about 89% ethylene and 11% methacrylic acid in which about 30% of the acid groups are neutralized with sodium hydroxide, to give the relative proportions of "vinyl," "ionomer" and "wax" solids as set forth in Table I.

TABLE I

| Example number | Coating composition, percent solids | | | | Composition pH | Heat seal to lacquer coat— | | Hot tack spring strengths, Oz./in. | |
| --- | --- | --- | --- | --- | --- | --- | --- | --- | --- |
| | Vinyl | Ionomer | Wax | Gloss | | A [1] | B [2] | [3] 0.6 | [3] 1.6 |
| 1 | 10 | 90 | | 63 | 10.4 | D | D | | P |
| 2 | 50 | 50 | | 62 | 10.3 | D | D | | P |
| 3 | 75 | 25 | | 68 | 10.2 | D | D | | P |
| 4 | 50 | 25 | 25 | 71 | 10.1 | D | D | P | (4) |
| 5 | 40 | 40 | 20 | 61 | 10.2 | D | D | | P |
| 6 | 25 | 50 | 25 | 68 | 10.2 | D | D | | P |
| 7 | 40 | 20 | 40 | 76 | 9.8 | D | D | P | P |

[1] High moistureproof coating from toluene solution containing ethylene/vinyl acetate copolymer and wax (Pierce-Stevens EVA 9525 lacquer).
[2] High heat seal coating (Morton 31 B 30 lacquer).
[3] Super calendered bleached kraft paper.
[4] Marginal.

In the following Examples 8–19 the coating compositions were prepared by mixing (A) a 50% solids dispersion of a copolymer of 75% ethylene and 25% vinyl acetate having a melt index of 20 and (B) a copolymer of 89% ethylene and 11% methacrylic acid (neutralized with sodium hydroxide to the pH set forth in the following Table II) and, in Examples 14–19, (C) paraffin wax (M.P. 141–145° F.) to provide the relative proportions of "vinyl" (75/25 ethylene/vinyl acetate copolymer), "ionomer" (89/11 ethylene/methacrylic acid copolymer) and "wax" solids as set forth in Table II.

In some instances, indicated in Table II, the glassine was precoated using a 20% solids dispersion of a copolymer of 85% ethylene and 15% methacrylic acid in which 60% of the acid groups are neutralized with sodium hyroxide.

TABLE II

| Example number | Precoat | Coating composition, percent solids | | | Composition pH | Heat seal to lacquer coat A [1] (250° F./ 0.5 sec./ 10 p.s.i.) | Hot tack (250° F, 0.5 sec./ 10 p.s.i.), spring strengths, oz./in. | | | |
| --- | --- | --- | --- | --- | --- | --- | --- | --- | --- | --- |
| | | Vinyl | Ionomer | Wax | | | 0.6 | 0.8 | 1.2 | 1.6 |
| 8 | No | 50 | 50 | | 9.0 | D | P | F | | |
| 9 | Yes | 50 | 50 | | 9.0 | D | | P | P | |
| 10 | No | 50 | 50 | | 10.0 | D | P | F | | |
| 11 | Yes | 50 | 50 | | 10.0 | D | | | | P |
| 12 | No | 50 | 50 | | 11.0 | D | | P | F | |
| 13 | Yes | 50 | 50 | | 11.0 | C | | | | P |
| 14 | No | 44 | 41 | 15 | 9.0 | D | P | F | | |
| 15 | Yes | 44 | 41 | 15 | 9.0 | D | | | | P |
| 16 | No | 44 | 41 | 15 | 10.0 | D | P | F | | |
| 17 | Yes | 44 | 41 | 15 | 10.0 | D | | | | P |
| 18 | No | 44 | 41 | 15 | 11.1 | D | | | | P |
| 19 | Yes | 44 | 41 | 15 | 11.1 | C | | | | P |

[1] High moistureproof coating from toluene solution containing ethylene/vinyl acetate copolymer and wax (Pierce-Stevens EVA 9525 lacquer).

In the following example, the compositions were prepared by mixing (A) a 50% solids dispersion of a copolymer of 72% ethylene and 28% vinyl acetate, having a melt index of 6 and containing sodium lauryl sulfate as dispersing aid, (B) a copolymer of 85% ethylene and 11% methacrylic acid (neutralized with sodium hydroxide to the pH set forth in the following Table III), and (C) wax to provide the relative proportions of "vinyl," "ionomer" and "wax" solids as set forth in Table III.

In each of these example, the glassine is precoated using a 20% solids dispersion of a copolymer of 85% ethylene and 15% methacrylic acid in which 60% of the acid groups are neutralized with sodium hydroxide.

TABLE III

| Example number | Vinyl | Ionomer | Wax | Composition pH | Heat seal to lacquer coat A [1] (250° F./ 0.5 sec./ 10 p.s.i.) | Hot tack spring strength, 1.6 oz./in. (250° F./ 0.5 sec./ 10 sec.) |
| --- | --- | --- | --- | --- | --- | --- |
| 20 | 30 | 40 | 30 | 11.7 | D | P |
| 21 | 25 | 50 | 25 | 11.7 | C-D | P |
| 22 | 40 | 40 | 20 | 11.5 | D | P |
| 23 | 50 | 30 | 20 | 11.5 | D | P |

[1] High moistureproof coating from toluene solution containing ethylene/vinyl acetate copolymer and wax (Pierce-Stevens EVA 9525 lacquer).

In Example 24, a 50% solids dispersion was prepared from a blend of the following ingredients, using sodium lauryl sulfate as dispersing acid; (A) a copolymer of 72% ethylene and 28% vinyl acetate, having a melt index of 6, (B) paraffin wax, (C) a copolymer of α-methyl styrene and vinyl toluene having a softening point of 120° C. and (D) a copolymer of 89% ethylene and 11% methacrylic acid, with about 70% of the acid groups neutralized with sodium hydroxide. The solids weight ratio of A, B, C and D are 40/25/20/15 respectively.

In Example 25, the composition was prepared by mixing (A) a 42% solids dispersion of a copolymer of 89% ethylene and 11% methacrylic acid having a melt index of 17 and with about 65% of the acid groups neutralized with sodium hydroxide, and (B) a 50% solids dispersion of three components, with sodium lauryl sulfate as dispersing aid (1) 42.5% of a copolymer of 72% ethylene and 28% vinyl acetate, having a melt index of 6, (2) 42.5% paraffin wax, and (3) 15% of a copolymer of 89% ethylene and 11% methacrylic acid with about 50% of the acid groups neutrailzed with sodium hydroxide. The solids weight ratio of A and B are 30/70.

In Example 26, the composition was prepared by mixing (A) a 50% solids dispersion of a copolymer of 72% ethylene and 28% vinyl acetate, having a melt index of 6 and containing sodium lauryl sulfate as dispersing aid, (B) a 20% solids dispersion of a copolymer of 85% ethylene and 15% methacrylic acid in which 60% of the acid groups are neutralized with sodium hydroxide, and (C) a 56% solids dispersion of (1) 15% of a copolymer of 89% ethylene and 11 methacrylic acid in which about 50% of the acid groups are neutralized with sodium hydroxide and (2) 85% paraffin wax. The solids weight ratio of A, B and C is 42/40/18.

The data are tabulated as follows:

TABLE IV

| Example number | Composition pH | Heat seal to lacquer coat A[1] (250° F./0.5 sec./10 p.s.i.) | Hot tack (250° F./0.5 sec./10 p.s.i. spring strenghts, oz./in.) | | |
|---|---|---|---|---|---|
| | | | 0.8 | 1.2 | 1.6 |
| 24 | | D | P | F | |
| 25 | 11 | D | | | P |
| 26 | 10.2 | D | | | P |

[1] High moistureproof coating from toluene solutions containing ethylene/vinyl acetate copolymer and wax (Pierce-Stevens EVA 9525 lacquer).

What is claimed is:

1. A sheet material having heat seal properties including high hot tack comprising a paper sheet substrate having thereon a coating consisting essentially of a mixture of (A) from about 10 to about 90% by weight of a copolymer of ethylene and a vinyl alkanoate and from 0 to about 10% of an alpha, beta-ethylenically unsaturated carboxylic acid, (B) from about 90 to about 10% by weight of a copolymer of ethylene and an alpha, beta-ethylenically unsaturated carboxylic acid in which from about 30 to about 90% of the acid groups are neutralized, and (C) from 0 to about 40% by weight of wax.

2. The sheet material of claim 1 wherein copolymer A contains from about 30 to about 97% of ethylene.

3. The sheet material of claim 2 wherein copolymer A is a copolymer of ethylene and vinyl acetate containing from about 50 to about 90% of ethylene.

4. The sheet material of claim 1 wherein copolymer B contains from about 60 to about 99.7% of ethylene.

5. The sheet material of claim 4 wherein copolymer B is a copolymer of ethylene and methacrylic acid containing from about 82 to about 95% of ethylene, and wherein from about 45 to about 75% of the acid groups are neutralized.

6. The sheet material of claim 1 wherein copolymer A contains from about 30 to about 97% of ethylene; wherein copolymer B contains from aboot 60 to about 99.7% of ethylene.

7. The sheet material of claim 6 wherein copolymer A is a copolymer of ethylene and vinyl acetate containing from about 50 to about 90% of ethylene; wherein copolymer B is a copolymer of ethylene and methacrylic acid containing from about 82 to about 95% of ethylene, and wherein from about 45 to about 75% of the acid groups of copolymer B are neutralized.

8. The sheet material of claim 1 wherein the relative proportions of A to B are from about 15 to about 80% of A to from about 85 to about 20% of B.

9. The sheet material of claim 1 wherein said paper substrate has a first coating thereon, underlying said coating of A and B, of a copolymer of ethylene and an alpha-beta-ethylenically unsaturated carboxylic acid in which from about 10 to about 60% of the acid groups are neutralized.

10. The sheet material of claim 1 wherein said paper substrate is glassine paper.

11. The sheet material of claim 10 wherein said glassine paper has a first coating thereon, underlying said coating of A and B, of a copolymer of ethylene and an, beta-ethylenically unsaturated carboxylic acid in which from about 10 to about 60% of the acid groups are neutralized.

12. The sheet material of claim 1 wherein the side of said paper substrate, opposite that containing said coating of A and B, has thereon a moisture barrier coating.

13. The sheet material of claim 12 wherein said moisture barrier coating comprises a copolymer of ethylene and a vinyl alkanoate.

14. The sheet material of claim 13 wherein said vinyl alkanoate is vinyl acetate.

15. The method of making a sheet material having heat seal properties including high hot tack which comprises applying to a flexible paper sheet substrate a coating of an aqueous dispersion in which the solids consist essentially of a mixture of (A) from about 10 to about 90% by weight of a copolymer of ethylene and a vinyl alkanoate and from 0 to about 10% of an alpha, beta-ethylenically unsaturated carboxylic acid, (B) from about 90 to about 10% by weight of a copolymer of ethylene and an alpha, beta-ethylenically unsaturated carboxylic acid in which from about 30 to about 90% of the acid groups are neutralized, and (C) from 0 to about 40% by weight of wax, said dispersion having a pH of at least 9, and thereafter drying the dispersion coating.

16. The method of claim 15 wherein said dispersion has a pH of from about 10 to about 11.

References Cited
UNITED STATES PATENTS

| | | | |
|---|---|---|---|
| 3,215,657 | 11/1965 | Beresniewicz et al. | 260—80.72 X |
| 3,394,097 | 7/1968 | Bissot | 117—155 X |
| 3,519,531 | 7/1970 | James et al. | 117—161 UX |
| 3,355,319 | 11/1967 | Rees | 117—122 |
| 3,347,811 | 10/1967 | Bissot | 117—161 X |
| 3,445,546 | 5/1969 | Pledger | 260—897 |
| 3,347,957 | 10/1967 | Adomaitis et al. | 260—897 |
| 3,483,023 | 12/1969 | Dotson et al. | 117—122 |
| 3,410,928 | 11/1968 | Baum | 260—897 |
| 3,524,759 | 8/1970 | McConnell et al. | 117—161 X |
| 3,541,035 | 11/1970 | Baum | 260—28.5 |

WILLIAM D. MARTIN, Primary Examiner

B. D. PIANALTO, Assistant Examiner

U.S. Cl. X.R.

117—76 A, 122 H; 260—28.5 AV, 897 B